United States Patent
Huesges

(10) Patent No.: US 6,598,576 B2
(45) Date of Patent: Jul. 29, 2003

(54) AIR INTAKE CHANNEL SYSTEM FOR INTERNAL COMBUSTION ENGINES

(75) Inventor: Hans-Juergen Huesges, Willich (DE)

(73) Assignee: Pierburg, GmbH, Neuss (DE)

( * ) Notice: Subject to any disclaimer, the term of this patent is extended or adjusted under 35 U.S.C. 154(b) by 0 days.

(21) Appl. No.: 10/213,592

(22) Filed: Aug. 7, 2002

(65) Prior Publication Data

US 2003/0029409 A1 Feb. 13, 2003

(30) Foreign Application Priority Data

Aug. 9, 2001 (DE) .......................... 101 39 302

(51) Int. Cl.⁷ ............................................... F02B 27/02
(52) U.S. Cl. ................................................ 123/184.55
(58) Field of Search ........................ 123/184.55, 184.53

(56) References Cited

U.S. PATENT DOCUMENTS 6,408,810 B1 * 6/2002 Leipelt et al. ......... 123/184.55
6,435,152 B1 * 8/2002 Leipelt et al. ......... 123/184.55

FOREIGN PATENT DOCUMENTS

DE 195 28 014 A1 7/1995
DE 197 56 332 A1 12/1997

* cited by examiner

Primary Examiner—Marguerite McMahon
(74) Attorney, Agent, or Firm—Ohlandt, Greeley, Ruggiero & Perle LLP

(57) ABSTRACT

An air intake channel system for internal combustion engines, particularly V engines, comprises a plurality of air intake channels. The air intake channels are respectively formed by two channel portions. The second channel portions are pivotal about a respective pivot axis, to vary the length of the air intake channel. The pivotal channel portions are supported in recesses of the stationary channel portion. According to the invention, a slide element is arranged in the recess in such a manner that it abuts on a radial and an axial abutment surface.

7 Claims, 5 Drawing Sheets

AIR INTAKE CHANNEL SYSTEM FOR INTERNAL COMBUSTION ENGINES

BACKGROUND OF THE INVENTION

The invention relates to an air intake system for internal combustion engines, particularly for V engines.

From German Patent 197 56 332, an air intake channel system is known wherein the length of several air intake channels, each of which is connectible with a cylinder of an internal combustion engine, can be varied smoothly. To this end, the helically configured intake channels are arranged next to each other. Each helical air intake channel comprises an air inlet opening connected with a central inner portion of the air intake system through which air inlet opening the air enters into the helical channel and is guided to the respective cylinder after having flown through the helical channel. Within the central portion, a tubular channel portion is arranged which forms the inner wall of the helical channel and comprises the air inlet opening. The tubular channel portion is pivotally arranged so that the position of the air inlet opening can be varied. In this manner, the length of the air intake channel, i.e., the distance between air inlet opening and air outlet opening to be flown through by the air, can be varied smoothly by pivoting the tubular channel portion.

The individual channel portions forming the intake channels are arranged adjacent to each other or in a stack, the configured air intake channels being alternately connected with the one or the other row of cylinders of the V motor. To pivot the inner pivotal channel portions, they are connected to a pivot axis. Thus, each air intake channel is substantially formed by a stationary channel portion and a pivotal channel portion. The tubular pivotal channel portion is supported in a recess of the stationary channel portion. The recess in the stationary channel portion comprises a radial and an axial abutment surface. Upon pivoting the pivotal channel portion, the pivotal channel portion slides on the radial as well as on the axial abutment surface. Since the two channel portions are made of plastics, the sliding occurs between two plastics parts. The mutual friction between plastic parts results in great wear. Further, no sufficient sealing between adjacent air intake channels is guaranteed because of the mutual friction of plastics parts.

From German Patent 195 28 014, an air intake channel system with a stationary and a pivotal channel portion for varying the length of the air intake channel is known as well. To seal the pivotal channel portion with respect to the stationary channel portion, it describes a labyrinth-like configuration of the portions sliding upon each other. Due to this labyrinth sealing, the sealing effect between the two channel portions can be improved, but two plastics parts do still slide upon each other. German Patent 195 28 014 further suggests to provide a radially or axially extending sealing disc instead of a labyrinth sealing. Two plastics parts still slide upon each other in these embodiments as well.

SUMMARY OF THE INVENTION

It is the object of the present invention to reduce wear in an air intake channel system with a good sealing effect between channel portions pivotal with respect to each other.

This object is solved, according to the invention, with the features of claim 1.

According to the invention, a slide element is provided in the recess of the one channel portion comprising a radial and an axial abutment surface for receiving the pivotal channel portion, said slide element abutting on the radial as well as on the axial abutment surface. Thus, the slide element with an, e.g., L-shaped cross section is both axially and radially arranged between the two channel portions. Thus, it is avoided that the two channel portions touch each other in the region of the recess of the one channel portion wherein the other channel portion is supported. The two channel portions only touch the slide element. Preferably, the slide element is made of metal so that only low sliding friction occurs between the two plastics channel portions and the slide element. Additionally, the slide element according to the invention acts as a labyrinth sealing.

Preferably, the slide element is laid such into the recess of a channel portion that it is freely rotatable. Since the slide element has no fast connection to any of the channel portions, the friction between the respective channel portions and the slide element and thus also the wear, particularly with different forces acting in the recess, are reduced.

To improve the sealing effect of the slide element, one of the two channel portions comprises a groove to receive the slide element. To this end, the slide element is provided with a retaining lug projecting into the groove. In this embodiment, the cross section of the slide element is preferably substantially C-shaped. The combination of slide element and groove corresponds to a labyrinth sealing.

Preferably, the slide elements are held by a groove provided in the pivotal channel portion. Thus, it is possible to preassemble the slide elements on the pivotal channel portions. This guarantees a simple and safe mounting of the respective channel portions.

BRIEF DESCRIPTION OF THE DRAWINGS

Hereinafter, the invention is explained in detail with reference to a preferred embodiment and with respect to the accompanying drawings, in which.

DETAILED DESCRIPTION

Figure 1:
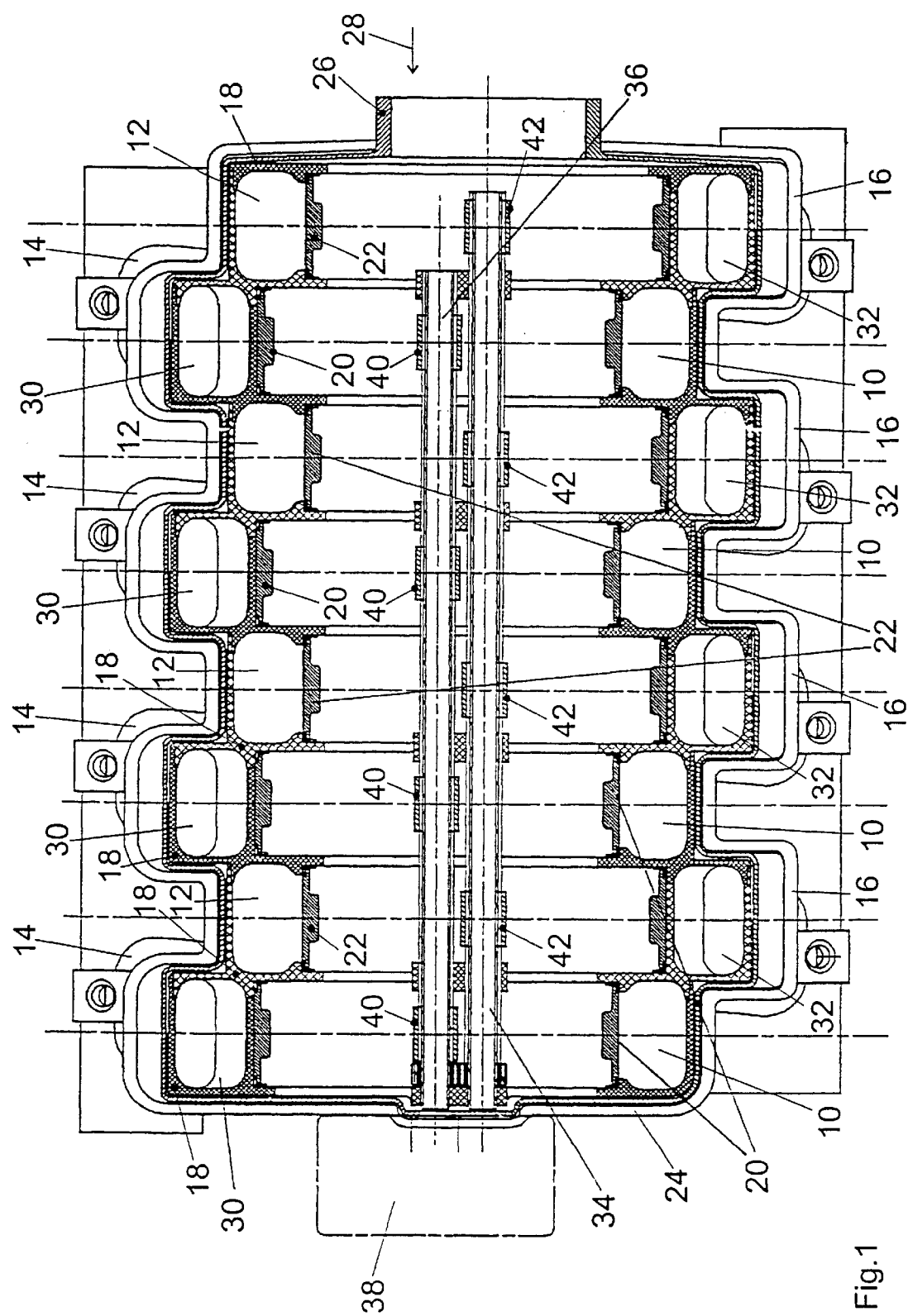
FIG. 1 shows a schematic sectional view of an air intake channel system for an 8-cylinder V engine.
Figure 2:
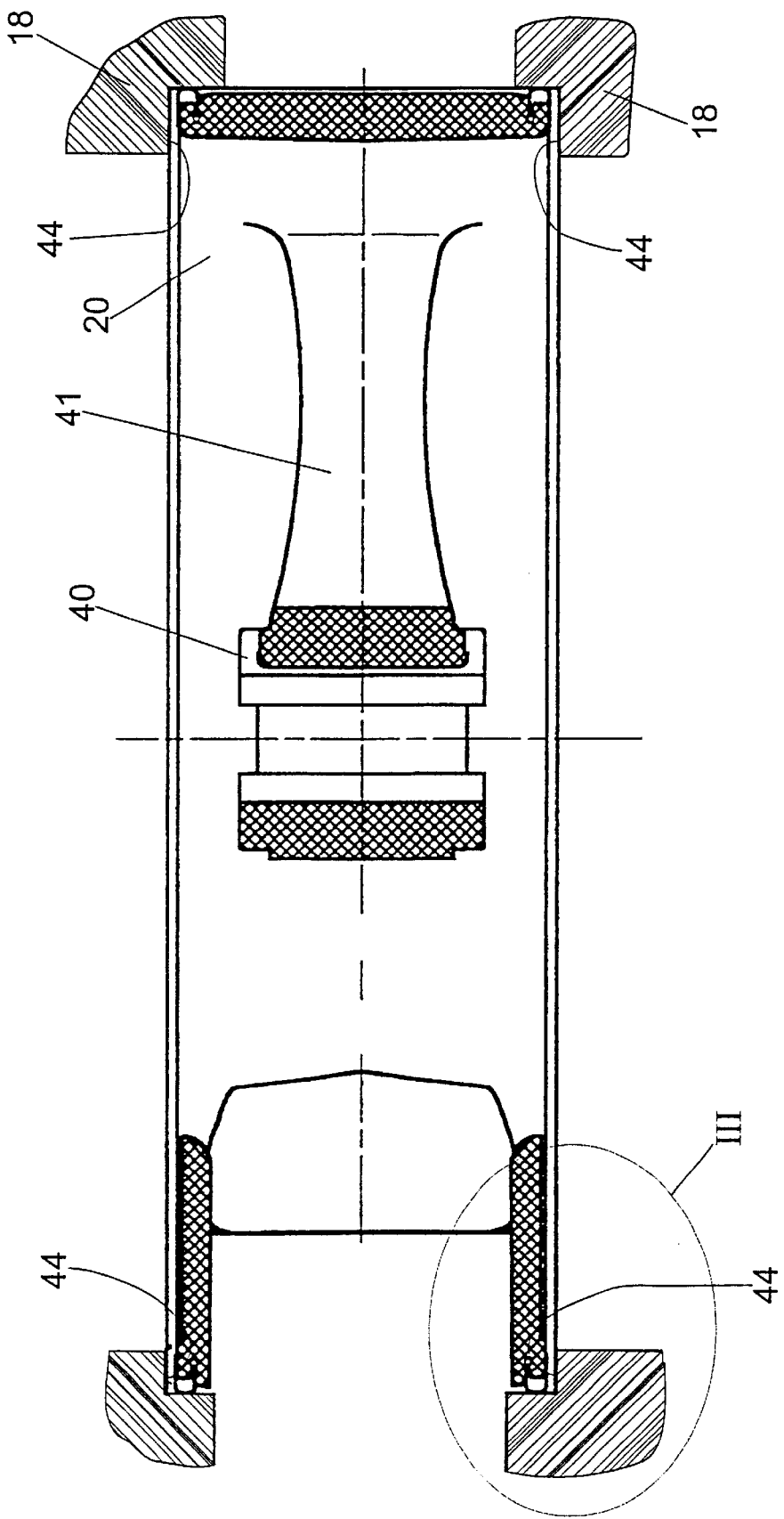
FIG. 2 shows a schematically enlarged illustration of a pivotal channel portion.
Figure 3:
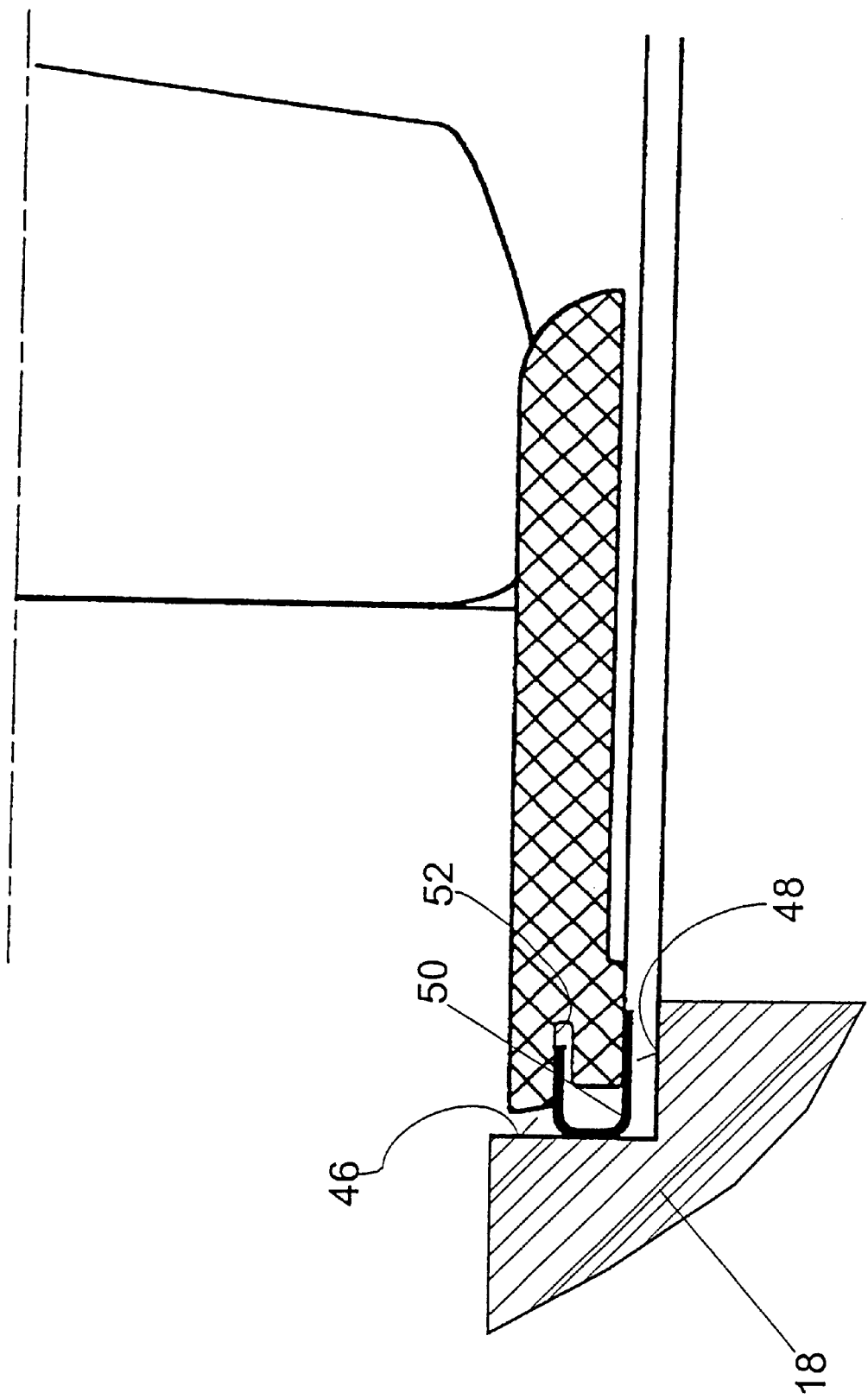
FIG. 3 shows an enlarged illustration of the portion III in FIG. 2.
Figure 4:
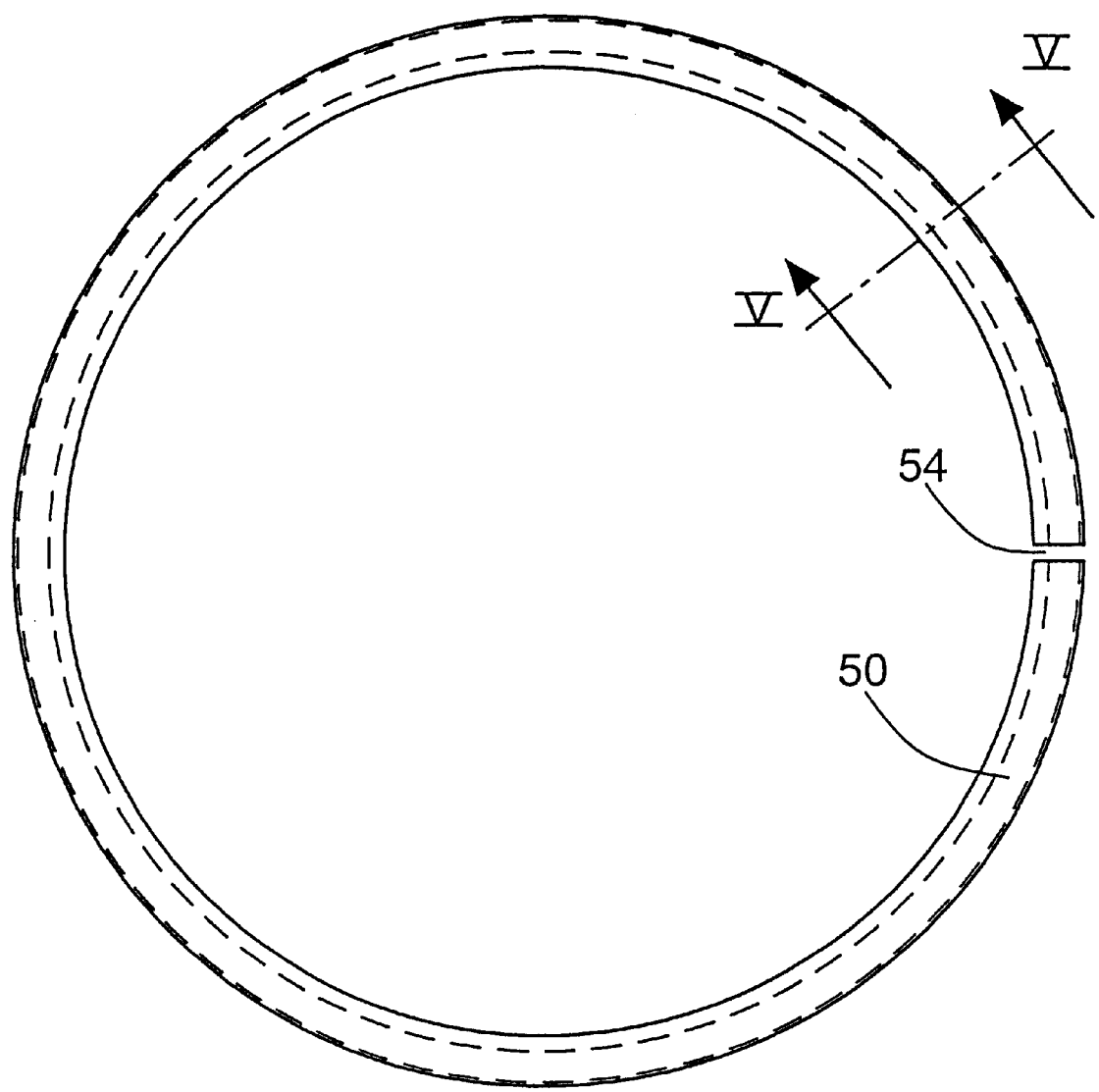
FIG. 4 shows a schematic top view of a slide element.

The air intake channel system comprises eight helically extending air intake channels 10, 12. Via lugs 14, the intake channels 10 are connected with the one side of the V engine and via lugs 16, the intake channels 12 are connected with the other side of the V engine. Each intake channel is formed by a first channel portion 18 that is stationary in the illustrated embodiment and a second pivotal channel portion 20, 22. Except for the two channel portions provided at the left and right edge of the Figure, all first channel portions 18 have an identical structure and are arranged adjacently or stacked upon each other, as shown in FIG. 1. The first channel portions 18 are arranged in a housing 24 consisting of two housing halves. The pivotal second channel portions 20 and 22 are identical as well.

The air to be supplied to the respective intake channels 10, 12 is guided via an intake fitting 26 in the direction of an arrow 28 into the inner portion of the air intake system. The inner portion is formed by the adjacently arranged pivotal channel portions 20, 22, each of which is substantially circular cylindrical. Depending on the configuration, additional intake openings may be connected with the respective air intake channels 10, 12, so that air flows into the air intake channels 10, 12 through the central portion of the air intake channel system as well as through the additional supply channels. From the central portion of the air intake channel system, the air flows through air inlet openings provided in the pivotal channel portions 20, 22 into the corresponding air intake channels 10, 12. From these, the air emerges through air outlet openings 30 and 32, respectively, and is guided to the respective cylinders through channels not shown.

To vary the length of the air intake channels 10, 12, the pivotal channel portions 20, 22 are fixedly connected with pivot axes 34, 36. By pivoting the pivot axes 34, 36 by means of an actuator 38, the positions of the air inlet openings of the pivotal channel portions 20, 22 are changed so that the air from the central portion enters into the helical air intake channels 10, 12 at another place and thus has to cover a shorter or a longer distance.

The second channel portions 20 are connected to holding devices 40 via webs and form an adjusting element. Via a tube profile (square), the holding devices 40 are connected to the pivot axis 36. The connection between the holding devices 40 and the pivot axis 36 is additionally effected by leaf springs. Correspondingly, the channel portions 22 are connected with the pivot axis 34 via webs and holding devices 42. Thus, the channel portions 20 and 22, respectively, are always pivoted in common, so that the air intake channels 10 and 12, respectively, on the respective side of the V engine have the same length.

The pivotal channel portion 20 is arranged between two adjacent stationary channel portions 18. To define the position of the pivotal channel portion 20, the stationary channel portions 18 comprise recesses 44. The recesses 44 comprise a radial abutment surface 46 and an axial abutment surface 48.

The slide element 50 according to the invention is held in a radially extending peripheral groove provided in the pivotal channel portion 20. Since the slide element 50 is preferably an annular slide element made of strip material surrounding the entire cylindrical channel portion 20 and comprises an opening 54, it can be inserted into the groove in a simple manner by dilating. Thus, the insertion of the slide element is performed as with a piston ring.

Figure 5:
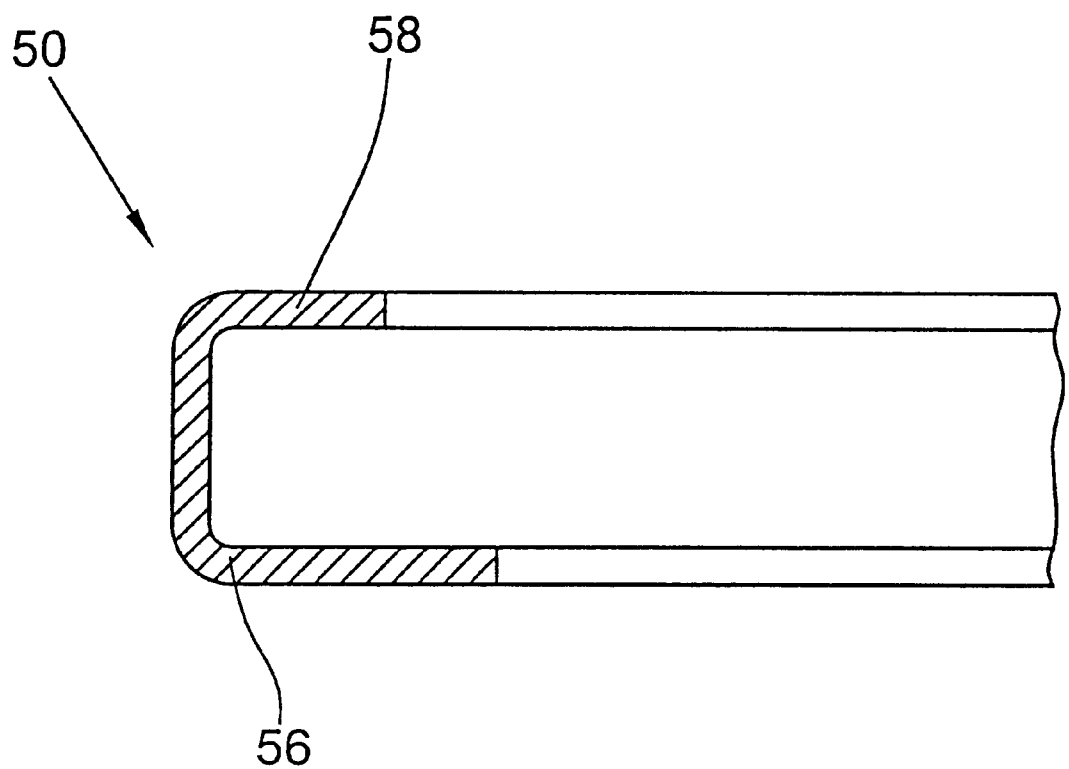
FIG. 5 shows a sectional view along line V—V in FIG. 4.

The slide element 50, which is C-shaped in the illustrated embodiment, consists of an L-shaped portion 56 and a retaining lug 58 (FIG. 5). The two legs of the L-shaped portion 56 of the slide element 50 abut on the radial abutment surface 46 and the axial abutment surface 48, respectively. Since the slide element 50 is inserted into the groove 52, the slide element 50 also fulfills the function of a sealing between two adjacent channels apart from its function to reduce the friction between the channel portions 18, 20. Together with the groove 52, the slide element 50 forms a labyrinth sealing.

What is claimed is:

1. An air intake channel system for internal combustion engines, comprising:

a plurality of air intake channels respectively formed by at least a first and a second channel portion, an air inlet opening provided in one of the channel portions and an air outlet opening provided on the other channel portion, at least one of the channel portions being pivotal about a pivot axis to vary the length of the respective air intake channel, said pivotal channel portion being supported in a recess of the other channel portion, said recess comprising a radial and an axial abutment surface, and a slide element abutting on the radial and the axial abutment surface.

2. The air intake channel system according to claim 1, wherein said slide element is L-shaped, one leg abutting on the radial abutment surface and the other leg abutting on the axial abutment surface.

3. The air intake channel system according to claim 1, wherein one of the channel portions comprises a radially extending groove for receiving the slide element.

4. The air intake channel system according to claim 3, wherein said slide element comprises a retaining lug projecting into the groove.

5. The air intake channel system according to claim 1, wherein said slide element has the shape of a circular arc or of an annulus.

6. The air intake channel system according to claim 1, wherein said slide element is made of strip material.

7. The air intake channel system according to claim 1, wherein said pivotal channel portion forms a channel wall extending axially with respect to the pivot axis and one slide element is provided in each of the two arcuate edge portions.

* * * * *